(12) United States Patent
Heie

(10) Patent No.: US 10,755,040 B2
(45) Date of Patent: Aug. 25, 2020

(54) METHOD AND SYSTEM FOR SEMANTICALLY GENERATING AND DIGITALLY PUBLISHING ARTICLES

(71) Applicant: Media Gazelle Inc., Las Vegas, NV (US)

(72) Inventor: Anders F. Heie, Las Vegas, NV (US)

(73) Assignee: Media Gazelle Inc., Las Vegas, NV (US)

( * ) Notice: Subject to any disclaimer, the term of this patent is extended or adjusted under 35 U.S.C. 154(b) by 141 days.

(21) Appl. No.: 15/981,344

(22) Filed: May 16, 2018

(65) Prior Publication Data

US 2018/0336175 A1    Nov. 22, 2018

Related U.S. Application Data

(60) Provisional application No. 62/507,295, filed on May 17, 2017.

(51) Int. Cl.
*G06F 17/00* (2019.01)
*G06F 40/186* (2020.01)
*G06F 40/279* (2020.01)

(52) U.S. Cl.
CPC .......... *G06F 40/186* (2020.01); *G06F 40/279* (2020.01)

(58) Field of Classification Search
CPC ... G06F 17/248; G06F 17/2765; G06F 40/186
See application file for complete search history.

(56) References Cited

U.S. PATENT DOCUMENTS

| | | | |
|---|---|---|---|
| 8,515,737 B2 | 8/2013 | Allen | |
| 8,630,919 B2 | 1/2014 | Baran et al. | |
| 8,775,161 B1 | 7/2014 | Nichols et al. | |
| 8,843,363 B2 | 9/2014 | Birnbaum et al. | |
| 9,519,635 B2 | 12/2016 | Allen et al. | |
| 9,535,879 B2 | 1/2017 | Allen | |
| 9,633,076 B1* | 4/2017 | Morton | G06F 16/248 |
| 9,697,197 B1 | 7/2017 | Birnbaum et al. | |
| 9,812,028 B1 | 11/2017 | Elchik et al. | |
| 2006/0167860 A1* | 7/2006 | Eliashberg | G06Q 30/06 |
| 2010/0268598 A1* | 10/2010 | Musgrove | G06Q 30/0253 705/14.51 |

(Continued)

OTHER PUBLICATIONS

Han, An Automatic Web News Article Contents Extraction System Based on RSS Feeds, 2009, Journal of Web Engineering, p. 268-284 (Year: 2009).*

*Primary Examiner* — Andrew T McIntosh

(74) *Attorney, Agent, or Firm* — Fox Rothschild LLP

(57) ABSTRACT

An automated content authoring system includes a semantic article writing engine that processes an article template that includes sentences with fillable fields. The article template includes an article context comprising an article subject type and a subject, and each of the fillable fields includes a field key. The article writing engine selects a data set that corresponds to the article subject type and the subject. For each of the fillable fields, the engine will look for content elements having an article key that corresponds to the field key. When retrieving a content element having an article key that corresponds to the field key, it will insert the attribute of that content element into the fillable field to yield the digital article. The system will then publish the digital article to a content publication service.

18 Claims, 9 Drawing Sheets

(56) References Cited

U.S. PATENT DOCUMENTS

| | | |
|---|---|---|
| 2011/0249953 A1 | 10/2011 | Suri et al. |
| 2014/0114647 A1 | 4/2014 | Allen |
| 2016/0012130 A1 | 1/2016 | Peng et al. |
| 2017/0235723 A1 | 8/2017 | Allen |
| 2017/0300477 A1 | 10/2017 | Long et al. |

* cited by examiner

201

{!art=band(metallica)}{!cher=musicbrainzid(bfcc6d75-a6a5-4bc6-8282-47aec8531818)}{!Nirvana=musicbrainzid(5b11f4ce-a62d-471e-81fc-a69a8278c7da)}<img src='{art.image}' style="width:300px;" /><br/> <br/> The {?if({!art.rating.value}>= 4.8)|extremely popular|}{?if({!art.rating.value}< 4.8 &&{!art.rating.value}>= 4.5)|extremely popular|}{?if({!art.rating.value}< 4.5 &&{!art.rating.value}>= 4)|popular|}{?if({!art.rating.value}< 4 &&{!art.rating.value}>= 3)|well known|}{?if({!art.rating.value}< 3 &&{!art.rating.value}>= 2)|relatively unknown|}{?if({!art.rating.value}< 2)|not very popular|}
{?if({!art.type}=Group)|{group|band}|}{?if({!art.type}=Person)|{artist|performer}|} {art.name} {?if({!art.type}=Group)|{was formed in|was started on|begun playing in|came together in}|}{?if({!art.type=Person)|{was born on|was born|first came into the world on}|} {art.lifespan.begin:MMM yyyy}{!? in {art.begin_area.name}}. The band consisted of {!bandmember=art.relations[]}{!Each(bandmember)|{?if({!bandmember.type}=member of band &&{!bandmember.direction}=backward)|{bandmember.artist.name}{!?, a {bandmember.artist.voice type} }{?if({!bandmember.artist.date of birth}<> "" &&{!bandmember.artist.date of death}<> "")| ({bandmember.artist.date of birth:tyear} - {bandmember.artist.date of death:year})|}{?if({!bandmember.artist.date of birth}<> "" &&{!bandmember.artist.date of death}="")| ({bandmember.artist.date of birth:year} - )|}, |}} <br/> Over the years, {art.name} released a number of {albums|recordings}, most of them with high rankings and good reviews. {?if({!art.facebook id}!= "")|{Btw|By the way}, {art.name}'s has a <a href="https://www.facebook.com/{art.facebook id}" target="_blank">facebook</a> account where you can learn more.|}<br/> <br/> <b>Albums</b><br/> {!RE=art.releases[]}{!Each(RE)|Released in {!RE.date:year}, {!RE.title} was a {!RE.media[1].trackcount} track {!RE.media[1].format}. {?if({!RE.media[1].format}=Cassette)| {Fun fact:} {!Re.title} was {released|sold} on Cassette back in the day. So if you find this in a store, you may want to invest in some {yester-tech'|old tech|ancient hardware} to enjoy it.|} <br/>} {?if({!art.official website}!= "")|<a href="{art.official website}" target="_blank">Visit {art.name}'s official website</a>|} <A href="{art.external urls.spotify}" target=_blank">Play {art.name} on Spotify</a>

FIG. 2

-- art: "person": Mick Jagger  
  allmovie artist id: : p95775  
  allmusic artist id: :mn0000892823  
  audio recording of the subject's spoken voice: : Mick Jagger BBC Radio4 Front Row 26 Dec 2012 b01pg54y flac  
  british museum person-institution: : 204799  
  date of birth: "date": 7/26/1943 12:00:00 AM  
  description: : British rock musician, member of The Rolling Stones  
  facebook id: : mickjaggerofficial  
  given name: : Michael  
  instance of: : human  
  member of: : The Rolling Stones  
  official website: : http://www.mickjagger.com  
  place of birth: : Dartford  
  sex or gender: : male  
  sibling: "person": Chris Jagger  
  social networks and archival context id: : w6z60x4j  
  wikitree id: : Jagger-84  
  award received 0: "award": MTV Video Music Award for Best Overall Performance  
  award received 1: "award": Golden Globe Award for Best Original Song  
  award received 2: "award": Broadcast Film Critics Association Award for Best Song  
  award received 3: "award": Las Vegas Film Critics Society Award for Best Song  
  award received 4: "award": World Soundtrack Award for Best Original Song Written Directly for a Film  
  award received 5: "award": Knight Bachelor  
  child 0: "person": Georgia May Jagger  
  child 1: "person": Jade Jagger  
  child 2: "person": Elizabeth Jagger  
  educated at 0: : London School of Economics  
  educated at 1: : Dartford Grammar School  
  genre 0: : rock music  
  genre 1: : blues

METHOD AND SYSTEM FOR SEMANTICALLY GENERATING AND DIGITALLY PUBLISHING ARTICLES

RELATED APPLICATIONS AND CLAIM OF PRIORITY

This patent document claims priority to U.S. Provisional Patent Application No. 62/507,295, filed May 17, 2017. The disclosure of the priority application is fully incorporated into this application by reference.

BACKGROUND

The ever-increasing use of online news feeds, social media platforms, and other online content services has resulted in substantial demand for new and interesting content. In addition, today's 24/7 news cycle requires the accurate generation and quick delivery of relevant, topical articles in response to news events. The amount of human capital required to satisfy these demands is significant. Journalists, fact-checkers and other copy writers must work quickly, efficiently and in large numbers to generate meaningful content around the clock.

To remedy this, some semi-automated natural language generation systems have been created. However, to date these systems have been limited to basic fill-in-the-blank templates, which still require human completion and which have little ability to create interesting and varied content.

In addition, existing natural language generation systems are limited in their ability to receive and integrate real-time news from a variety of content publishers. With the explosion of digital content feeds, the processing power and bandwidth required to quickly identify information that can be used to generate content can require an enormous cost, and it generally limits natural language generations to using an existing (and static) corpus of source material. In addition, existing systems cannot generate dynamic content that changes in real-time as facts change and/or source material is updated. Further, the proliferation of "fake news" and propaganda-laden feeds creates additional technical challenges for automated systems to be able to discern reliable source material from false or misleading information.

This document describes methods and systems that are directed to solving at least some of the issues described above.

SUMMARY

In an embodiment, an automated content authoring system includes an input engine comprising a memory portion containing programming instructions that are configured to cause one or more processors to access multiple content feeds via a communication network, retrieve one or more data sets from each of the content feeds, and analyze each of the retrieved data sets to identify content elements in each of the content feeds. Each of the content elements comprises an article key and an attribute. The system also includes a semantic article writing engine comprising a memory portion containing programming instructions that are configured to cause one or more processors to generate a digital article. The engine generates the digital article by processing an article template comprising fillable fields. The article template also comprises an article context comprising an article subject type and a subject, and each of the fillable fields includes a field key. For one or more of the fillable fields, the system will selecting one or more of the content feeds having a feed subject type that corresponds to the article subject type, and it will call the selected one or more content feeds to retrieve a content element having an article key that corresponds to the field key. When the system retrieves a content element having an article key that corresponds to the field key, then in response it will insert the attribute of that content element into the fillable field to yield the digital article. An output engine will cause one or more processors to publish the digital article to a content publication service.

In some embodiments, the field keys for at least some of the fillable fields require at least two levels of data. If so, then when selecting the one or more content feeds for any fillable field having at least two levels, the system may only select a particular content feed to provide second level data for that fillable field if the system has already obtained, or the particular content feed can also provide, first level data for the field.

Optionally, the input engine also includes instructions configured to cause one or more processors to assign each of the content feeds one or more feed subject types, as well as a confidence level for each of the feed subject types. If so, then when the semantic article writing engine selects one or more of the content feeds having a feed subject type that corresponds to the article subject type, it may identify and select a content feed having a feed subject type that semantically matches the article subject type, and a confidence level of at least a first threshold value for the feed subject type. In addition, if the field keys for at least some of the fillable fields require at least two levels of data, then when identifying and selecting a content feed having a feed subject type that semantically matches the article subject type and a confidence level of at least a first threshold value for the feed subject type the system may, if multiple candidate content feeds have equivalent confidence levels, select a particular content feed that can provide first level data so that the particular content feed can provide data for multiple fillable fields.

Optionally, the input engine also includes instructions configured to match input fields to a subset of the article fields, and if a match is found that satisfies the conditions of the article, the input engine can schedule the article for generation. Conditions may include that some input fields are required or optional, or that the type of the article field is a match with the input field type.

Optionally, the article template may include a group of sentences. At least some of the fillable fields may be components of the sentences of the template. If so, then when the semantic article writing engine generates the digital article it may, for any fillable field for which the calling step does not retrieve a content element having an article key that corresponds to the field key, either omit the sentence that includes that fillable field or modify the sentence that includes that fillable field.

Optionally, the article template may include at least one sentence with a sentence fragment having various alternatives. If so, then when the semantic article writing engine generates the digital article it may randomly select one of the plurality of alternatives and use the randomly selected alternative as the sentence fragment in the digital article. In addition, the semantic article writing engine may generate an additional article that is similar to but distinct from the first article by randomly selecting a different one of the plurality of alternatives, and by using the article template, the retrieved content element and the randomly selected different alternative as a sentence fragment for the additional digital article.

Optionally, the article template may include at least one fillable field for which the field key is a coincidence. If so, then when the semantic article writing engine generates the digital article it may identify any coincidental data points in the data set and, upon detecting a ground of coincidental data points, complete the fillable field with information relating to the coincidental data points.

Optionally, the template may include programming code for presentation of dynamic content via a media player or browser, along with the fillable fields. If so, then the output may include a script for presentation of the dynamic content via the media player or browser.

In an alternate embodiment, an automated content authoring system includes a semantic article writing engine comprising a memory portion containing programming instructions that are configured to cause one or more processors to generate a digital article by: (1) maintaining a data tree comprising a plurality of content elements, each of which has an article key and an attribute; (2) processing an article template comprising a plurality of sentences, at least some of which comprise fillable fields, wherein the article template comprises an article context comprising an article subject type and a subject, and each of the fillable fields includes a field key; and (3) selecting a data set that corresponds to the article subject type and the subject. For each of the fillable fields, the semantic article writing engine may select, from the data tree, a content element having an article key that corresponds to the field key. When the engine retrieves a content element having an article key that corresponds to the field key, then in response it may insert the attribute of that content element into the fillable field to yield the digital article. The system may then publish the digital article to a content publication service.

BRIEF DESCRIPTION OF THE DRAWINGS

FIG. 2 illustrates an example article template.

FIG. 6 illustrates a segment of a data tree containing data returned from various content feeds.

DETAILED DESCRIPTION

Figure 1:
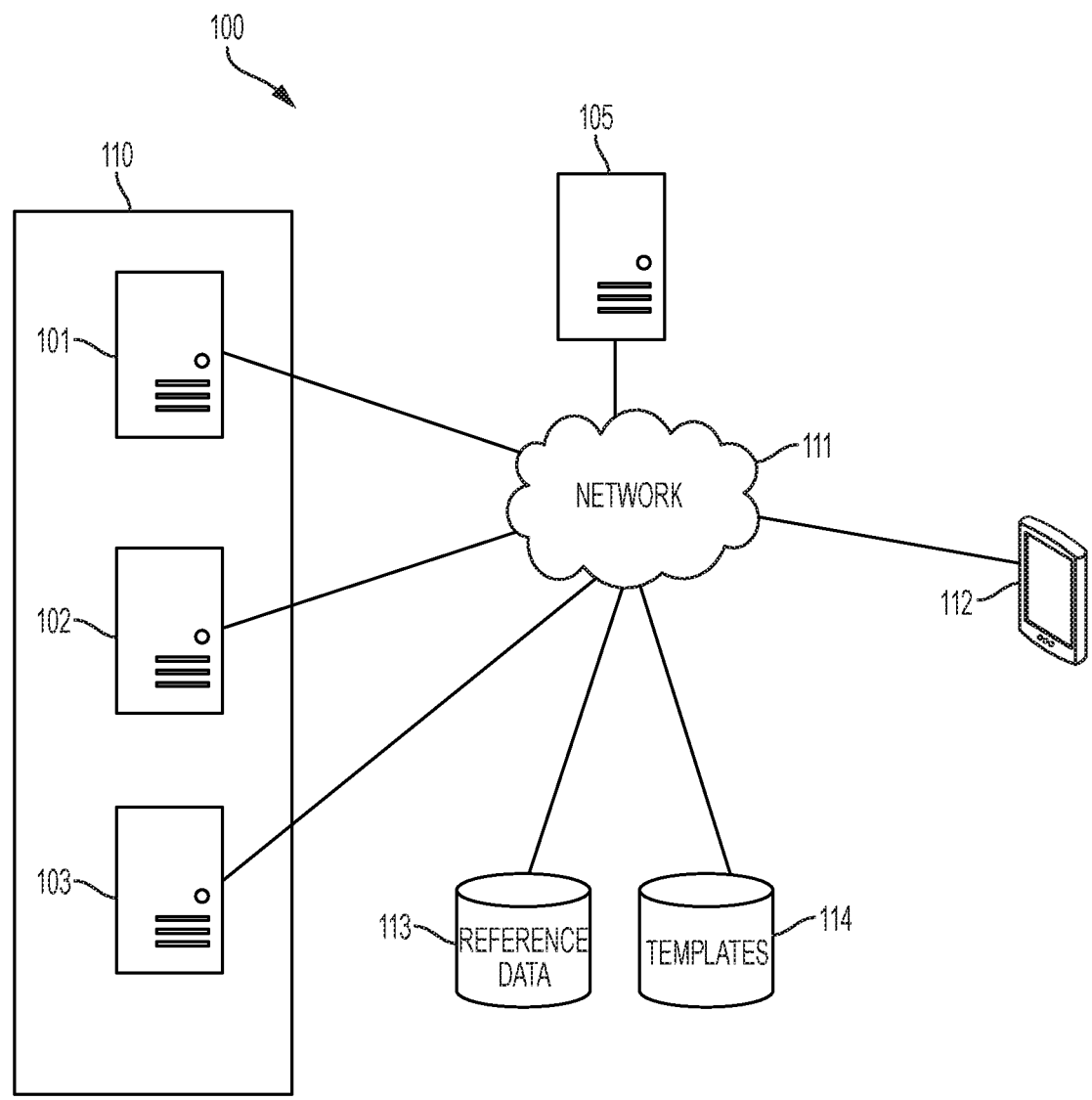
FIG. 1 is a block diagram illustrating various features that an automated content authoring system may include and/or use.

Terminology that is relevant to this disclosure includes:

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, media players and the like. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity.

In this document, the terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In this document, the singular forms "a," "an," and "the" include plural references unless the context clearly dictates otherwise.

In this document, the term "article" refers to any type of digital content, including but not limited to text, markup language, image, graphics, animations, video, audio, flash scripts, other scripts and .css files. For purposes of clarity, examples in this patent document mainly use the text-form of article.

In this document, the term "comprising" means "including, but not limited to."

Unless defined otherwise, all technical and scientific terms used in this document have the same meanings as commonly understood by one of ordinary skill in the art.

FIG. 1 is a block diagram illustrating various features that an automated content authoring system 100 may include and/or use. The system may include an input engine 101, a semantic article writing engine 102, and an output engine 103. Each of the engines will include programming instructions, a memory portion to contain the programming instructions and a processing device to implement the instructions. Some or all of the engines may be part of a single system 110 that shares one or more processors and memory devices, or they may be separate devices having their own processor and/or memory. Any or all of the single system 110 and content publication service 105, and Reference Data 113 and Templates 114 also may be a single device or system, or they may be separate devices that share data via a communication network 111 as shown.

The input engine 101 obtains and supplies input from any number of sources needed to process a template. The input engine 101 may receive content feeds from related and/or third party services via a communication network 111 such as the Internet. The input engine 101 also may obtain stored content from one or more databases of reference data 113, and it may store data that it receives from the third party content feeds in a reference data database 113.

The semantic article writing engine 102 is the core of the system. (For brevity, this document may refer to a semantic article writing engine 102 as a "SAW.") The SAW 102 generates articles for digital publication. An article is a digital file containing content that may include text, graphics, images, video and/or other digital content. The examples described below will be articles that mostly comprise text, but it will be apparent that the SAW 102 may include and generate other types of digital content as well. The content of the digital file may be published to an wide audience such as via an online article, a digital newsletter, a blog post or feed, a video site, a social media feed, or any other medium. Alternatively, the digital content may be directly published to one or more recipients who requested the content, such as a to a client or customer of the publisher.

The SAW 102 receives an input that will be a subject for an article, and it uses an article template to generate and output an article based on the subject. Each template may permit the system to automatically generate different articles based on a change to the input value. For example, the system may use a template to generate an article about the subject "Mick Jagger," and it may use the same template to generate a different article about a different subject performer, using any and all data available to the system about that subject performer. The SAW 102 will obtain templates from a template data store 114. One or more modules of the system also may generate and output a user interface that enables users to generate new templates and modify existing templates. Each template will include a set of sentences, at least some of which have fillable fields. Each article template is associated with an article context comprising an article subject type and a subject, and each of the fillable fields includes a field key. An example article template 201 is illustrated in FIG. 2. How the system may use these attributes of a template will be described in more detail below.

The output created may be distributed to various destinations, such as websites, blogs, social media and other publication services. In addition, digital articles can be generated in multiple formats. Returning to FIG. 1, when the system generates an article, the output engine 103 will publish the article to a content publication service 105, which will transmit the article to any number of end user electronic devices 112 via the communication network 111. The output engine 103 and content publication service 105 also may be a single device or system, or they may be separate devices that share data via a communication network 111 as shown.

Additional features of each of these components of the system will be described in more detail below.

Figure 3:
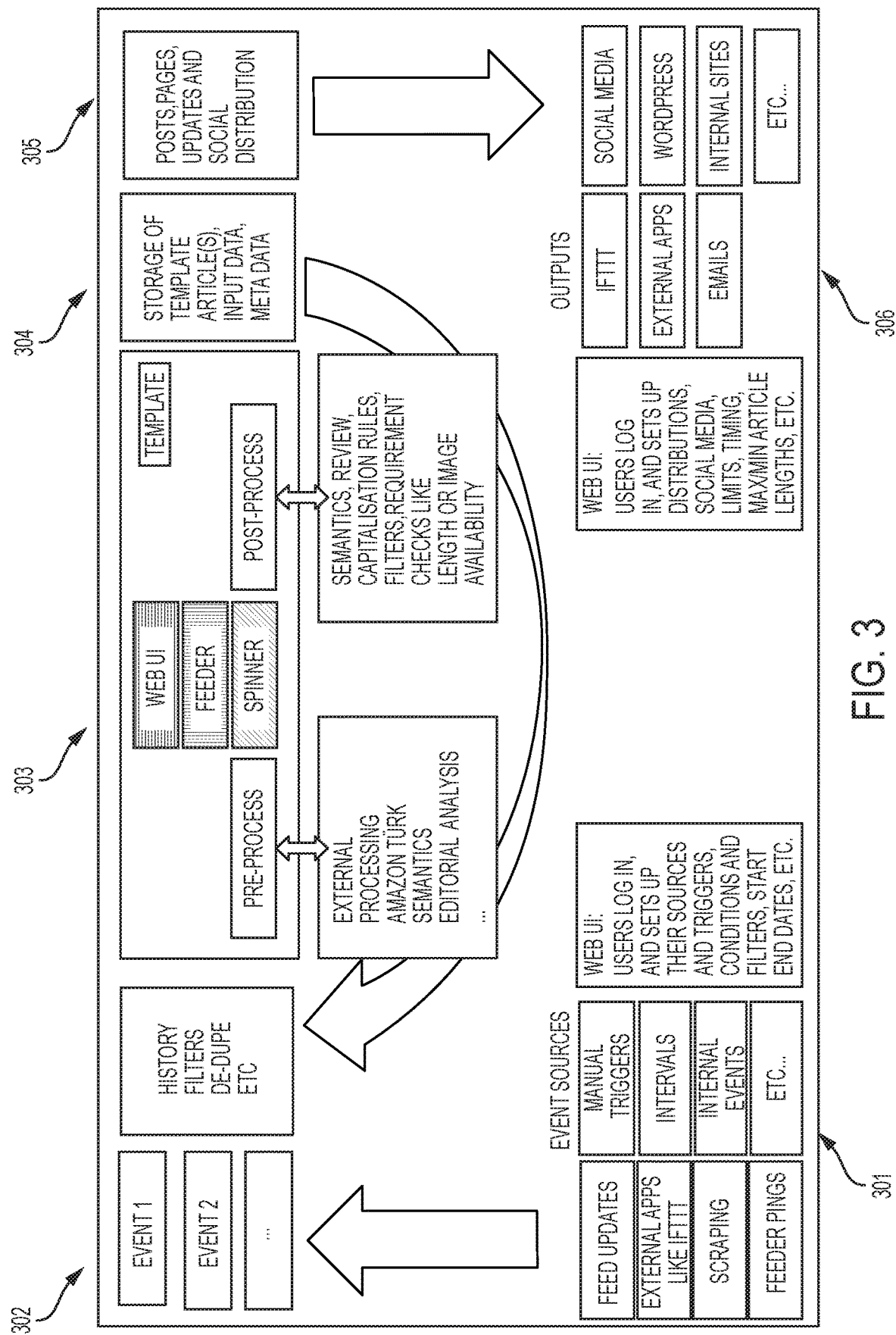
FIG. 3 illustrates an example process flow of an automated content authoring system.

FIG. 3 illustrates an example process flow that various embodiments of the system may follow. The lower left section 301 of FIG. 3 illustrates examples of event sources that may provide inputs that will be used to generate articles. For example, an input may be an article or digital post indicating that someone has released a new album, or that a notable person died during the last week. The input engine may monitor various third party data sources (i.e., content feeds) via the communication network to automatically identify a data set for an event that can serve as article subject. The input engine may do this by identifying events that are trending on one or more social media sites, events that are the subject of articles on a threshold number of news sites, or based on other criteria. The input engine also may include a user interface by which a user of the system manually input an event or a fieldset to match. Each event will contain core data about the subject. For example, an article for an event that is a particular musician's new song or album release may include data such as the artist's name and the title of the new song or album. The system will analyze each retrieved data set to identify content elements that will serve as key-attribute pairs for a new article. For example, if an event involves Mick Jagger, the article key may be "musician" and the attribute may be "Mick Jagger."

As illustrated in the upper left section of FIG. 3, the input engine will process events 302 to check for duplicates, to fact-check the accuracy of an event, and/or confirm the history of events. In some cases events may need to be eliminated, filtered, or manipulated before being sent to the SAW. This may be done automatically using any suitable process, such as automatically searching for semantic matches, and/or with manual review by an administrator.

The upper middle area 303 of FIG. 3 illustrates example actions of the SAW for an event template. Some events may need pre-processing, such as manual examination to determine topics (such as, for example, politics) using processes such as a semantics engine to extract core information like sentiment or people names (in case of a news article being the input), manual analyses, and/or third party services such as Amazon Mechanical Turk. After this, the events are passed to any templates that subscribe to them, and the SAW starts processing the templates with the event input, and generates a data tree. The data tree contains the context of the template data, which is used to create the article. This will be described in more detail below.

After the article is generated it may enter a review queue for manual review by an administrator, and/or the article may be subject to automated post-processing such as fixing spelling errors, capitalization rules, semantic analysis, etc. The system also may include filters to delete articles that fail to meet certain criteria, such as a minimum length requirement or a requirement that the article contain an image.

Some or all of the data used to generate an article, including but not limited to the event and the data tree, may be stored in a data store 304 such as the reference data store 113 of FIG. 1. In this way, the data is available to analyze causes of any template failures that may occur, or to serve as priority data for future articles about a particular subject.

When an article is ready to publish, the output engine may publish it to one or more publication services 305. Optionally, the publication services may be grouped into "destination groups", each of which contains a number of destinations such as a website, social media service, etc. When the output is ready, the database has a map of which destination group should receive it (for example based on categories). The destination groups then distribute the article to each of the actual destinations 306 based on a set of rules in the system.

In some embodiments, a generated article may include multiple sections, such as the article itself, as well as other components such as one or more categories, tags, featured image(s), and/or a summary. Different destinations may require different sections of the output. For example, websites may use the sections "article," "categories," "tags" and "featured image," while a social media service such as Facebook may use "summary" and "featured image." The output engine may track the success of each post by monitoring the final location at which the article is published, and it may add this information to an article tracking database. If an article later needs to be amended, or retracted, the system can refer to this database to identify exactly where and when the article was previously published.

Figure 4:
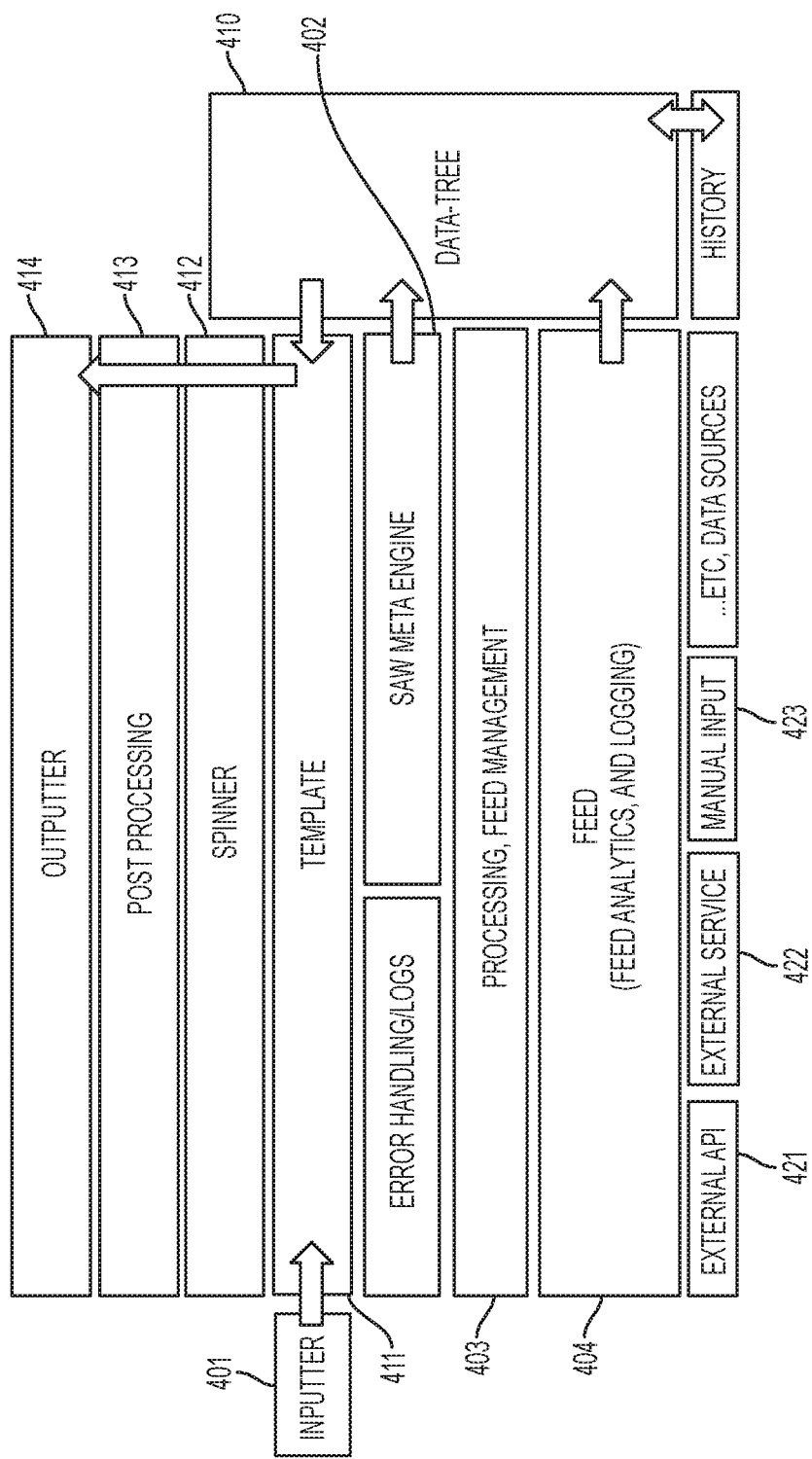
FIG. 4 provides additional detail about various aspects of a semantic article writing engine.

FIG. 4 provides additional detail of actions that the SAW may implement. Each content feed that the SAW receives from the input engine 401 provides a data set. The SAW 402 will map each set of data to a set of known data types, such as person, location, building, award, band, etc. In turn, a feed management module 403 will map each feed to such type as the system considers being able to "realize" them. For example, the system may consider the feed WikiData to be a preferred feed to realize data for subjects that include persons, awards, buildings and bands. This means that when an input data set contains one of these types and the template calls for additional information about these particular data points (such as {person.date of birth}), the system may check the content feed WikiData to provide that information. A feed analytics module 404 may analyze the feeds. For example, feeds may be ranked in an order of preference using a ranking method such as confidence level ranking (described below), so that if a first preferred feed is unable to return the requested information, the system may check a next preferred content feed, etc. The SAW will use this data to generate a data tree 410, apply the data to a template 411, "spin" the article (as described below) 412, post-process the article 413, and output it 414 for publication. In addition to feed data, the system also may receive and use data from other sources, such as an external application programming interface (API) 421, an external service 422, manual input via a user interface 423, and/or other sources.

Figure 5:
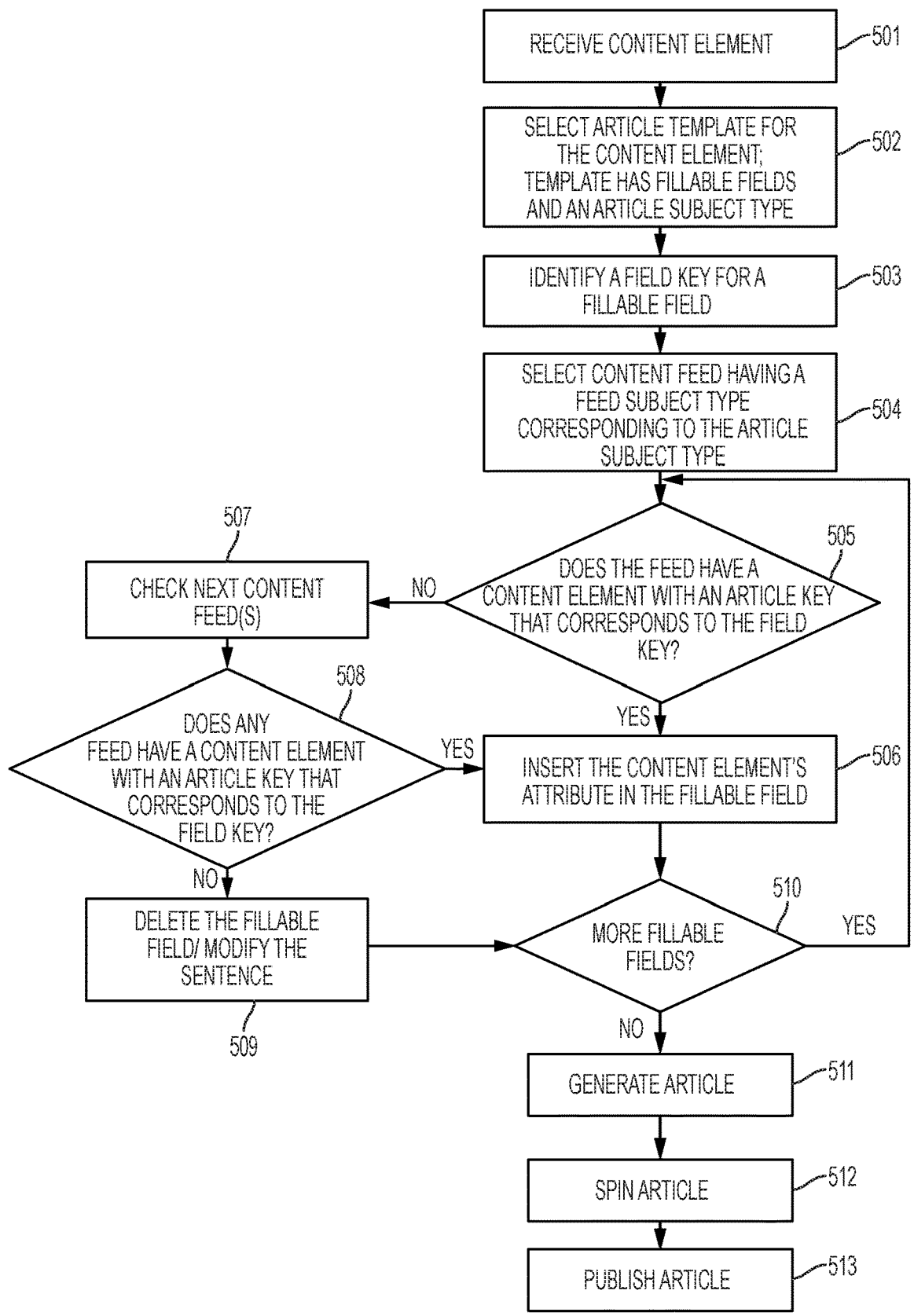
FIG. 5 is a flow diagram illustrating steps that the semantic article writing engine may implement.

In particular, referring to FIG. 5, when the SAW receives a content feed's content element from the input engine 501, it will note that the content element includes a key-attribute pair for the article. As noted above, the key will correspond to a subject (e.g., "musician") and an associated attribute (e.g., "Mick Jagger"). The input engine, SAW, or a human administrator will select one ore more templates 502 having a context comprising an article subject type and a subject, where the subject of the templates semantically corresponds to the subject of the input content element. In this way, for example, if the subject is "musician" the system may select a template that will generate an article about a musician.

The template will have any number of fillable fields, each of which includes a field key 503. As with an article key, a field key also corresponds to a subject with which an attribute may be associated. (Thus, the term "field key" simply refers to a key for a fillable field, while the term "article key" refers to a key for an article). The SAW will call (i.e., access) those content feeds to retrieve a content element having an article key that corresponds to the field key 504. If the feed returns a content element having an article key that corresponds to the field key 505, the SAW will insert that content element's attribute value into the fillable field 506. If the feed does not return a content element having an article key that corresponds to the field key, the SAW will then call an alternate feed 507, and it will continue to do so until either: (a) it finds a content element with an article key that corresponds to the field key; or (b) a threshold number of feeds have been checked or all available preferred feeds have been checked 508. If no feed returns a content element having an article key that corresponds to the field key, the system may modify the sentence by removing that fillable field or part of the sentence previously marked when generating the article 509. The system will then repeat this process for all fillable fields of the template 510, until the article is complete 511, at which time the system may publish the article 513 to a content publication service such as a website, social media site, news service or the like, or directly to one or more subscribers, clients or intended recipients.

Optionally, the input engine also includes instructions configured to match input fields to a subset of the article fields, and if a match is found that satisfies the conditions of the article, the input engine may publish the article. Conditions may include that some input fields are required or optional, or that the type of the article field is a match with the input field type. Thus, for example, rather than match based on a type of field, the system may match content to fields just based on the field names. For example for a stock article, the system would match the stock TICKER as a required input, the stock EXCHANGE as an optional input and the stock NAME as an optional input. Thus, the field type becomes irrelevant because the input code specifically only check for this particular information about stocks.

Optionally, to generate multiple versions of an article, or to provide some randomness in the generation of an article, a "spinner module" may "spin" the output 512 before it is published. By this we mean that the system randomly replaces one or more words in the template with synonyms, move paragraphs of the template around, branch sentences based on logical decisions, or otherwise change the article. To enable spinning, the article template will include at least one sentence with a sentence fragment various alternatives. The template also may include various rules or options for randomization. For example, the template 201 of FIG. 2 includes an example where any of the phrases "was born on," "was born" or "first came into the world on" may be interchangeably and randomly used as a sentence fragment before the fillable field for the subject's date of birth (which is the fillable field {!art.life-span.begin:MMM yyyy} in this example). The SAW randomly selects one of the alternatives and uses it as the sentence fragment when completing the digital article. Thus, the system may use a single template and process a single subject (e.g., "Mick Jagger"), while producing any number of unique articles by "spinning" the output, so that different versions of the article are published to different content publication services.

The examples above illustrate an article that is static, such as a web page or other digital publication. However, in some embodiments and article may be generated in digital format of a video, image, graphic, audio, virtual reality, augmented reality, mixed reality, animation, or interactive application file. In such embodiments, the template may include fillable fields as described above, along with programming code that causes the video, audio, or other dynamic content of the article to be output by a media player or browser. The combination of content in the fillable fields and the programming code may serve as a script to present the article (e.g., video, audio, etc.) in a media player or browser. Examples of such scripts and media players include files generated in the ActionScript programming language for the presentation of content on an Adobe Flash-enabled media player. The SAW may access a template in the applicable programming language and generate the script based on the template and the content feeds. The article generation engine may thus be considered to be a video generation engine, audio generation engine, animation generation engine, or other engine suitable for generating the desired type of output. Optionally, the article generation engine or another component of the system may include a file formatting engine that converts the script into code that can be run on one or more designated media players or browsers.

Content Feeds

A content feed is a representation and/or encapsulation of a data source (such as a news feed, a social media site, third party services like WikiData, or even a local database). Each feed may support multiple different application programming interface (API) calls, such as a call for data relating to a person or a building. The data returned by the feed may be in JSON, XML or another format, and the SAW will map each field of the returned data in the database. Optionally, the system may provide a user interface that allows a user to see dropdown lists, as will be described below.

The system may calculate statistical data about how often a field is available, or other metrics about various fields. For example, if a content element corresponding to a particular field in a template is only returned very rarely, it can mean that it is more interesting. A template having rare fields may result in more unique and more interesting article, since it uses data that is not widely available (or at least widely published).

The system will track any errors in a feed, and log them. This may happen based on human administrator review or by an automated fact-checking process. In some cases the system may shut down or pause (i.e., no longer use) a content feed if the number of errors exceeds system thresholds. If this occurs, then the feed that is next up in a confidence level ranking would be used, and it would get a chance to be the preferred feed from that point going forward.

A "preferred" feed is that having a highest confidence score for a particular subject. Each feed has a confidence score (0-100), which can be set automatically, or manually, in the database. Furthermore, each individual field or type can have confidence scores. When a the SAW requests a content element for a field, such as {person.date of birth} the system may follow a process such that described below"

A. Does the field "date of birth" have an explicit confidence level mapped to feeds?
  1. If yes, then try each feed in decreasing levels of confidence. For each feed:
    a. Mark the feed as "realized" for this field.
    b. Is the field resolved?
      (1) If yes, then done, the system has the data that it needs.
      (2) If no, move on to next feed.
  2. If no, then move on to the next feed.
B. Does the type "person" have explicit confidence levels mapped to feeds?
  1. If yes, then try each feed in decreasing levels of confidence. For each feed:
    a. Mark the feed as "realized" for this field.
    b. Is the field resolved?
      (1) If yes, then done, the system has the data that it needs.
      (2) If no, move on to next feed.
C. When all relevant feeds have been run, the system has either succeeded or not.

The system may also follow various methods to reduce the number of feed calls. For example, each feed may be set up to require a set of parameters to run. For a person, for example, the system requires either the name of the person, or a third party service identifier (e.g., musicbrainzID). Each of these can be used in a third party service (such as WikiData) to uniquely locate the person. The SAW will check if these inputs are available in the data tree before calling each feed. Sets of inputs may be ranked in order of preference. For example, using an identifier like musicbrainzID is more exact than using a name (which can be ambiguous), so the system ranks the set using musicbrainzID higher than the one using just the name. This can increase the precision of the data retrieved.

Each feed may implement one or more internal methods to retrieve the data. Each such method will be marked as "realized" when called, so it won't be called again for the same data in the future (or at least, not for a threshold period of time, or not again for this article). This may be done based on the data in the tree, so for example if a specific name (e.g., Mick Jagger) can't be resolved, that feed won't be called again with "Mick Jagger". But it may be called again for other names.

The use of confidence scores be used to limit source content to feeds with higher confidence scores can help avoid the system generating articles based on "fake news" or propaganda. In addition, using the option to only call a feed if the feed typically knows about a field can also reduce calls. If a feed is mapped to a type, like a person, but the system knows based on data in the database that it has never before returned {person.education}, this flag would know, and it may prevent the feed from being called in the first place to help supply information for a fillable field that asks about a person's education.

Another option for the feeds is to analyze how many times a feed has been called in the past, and calculate a percentage chance of the system calling it even if that feed typically doesn't know how to resolve a field (such as {person.education}). Because feed data can change, the system may try calling the feed occasionally to see if it receives new fields. Thus, the system assigns a percent chance based on how often that feed's API has been called in the past and when it was last called. For example, less commonly used feeds may be assigned a relatively high chance to be called, while very commonly used feeds may be assigned a relatively smaller chance. If more time has passed since last time that a feed was called, this may also increase the chance of that feed being tested with another call. The configuration of the math may be set manually, or calculated automatically by the system.

Each fillable field may be associated with a field key, and the SAW may use the field keys to map content elements from feeds to fillable fields by retrieving content elements having article keys that correspond to the field key of a fillable field. The system may identify this by manual input, or by automated analysis such as by reviewing content elements and detecting names in the content element that may serve as article keys. If a name is detected, the system may know that this data point is of the type "person", and it can mark it as such in the database. Similarly, the system may detect dates, URLs, locations, images, buildings, and so on in content feeds.

If a field contains unknown data, the system may pass the data value to a third party service such as WikiData. If the third party service resolves the data value the system may auto-determine the type of data based on the third party service data types. The system then also knows that the third party service's content feed can be considered to be a "realizer" of this data with a relatively high confidence level. This means that a lot of the setup can be fully automated and simply subject to occasional human review if and as needed.

A content element of a content feed also may include a data type that this document may refer to as a "hint". A hint is an indication that a field can be for one of several data types. For example the system may use the hint "artist" to specify that a field could be of type person, band or character. As the feeds starts to collect data, when one of them knows for sure which type is correct, it may change the type to use the correct one for all the subsequent feeds. The system may use hints when it is not certain what the input is, except that it is for sure one of a known group of input types. The hints assist the feeds to get only relevant data, and match it.

Each call to a feed returns a set of data. The system may store the results of each call to a feed in a data tree, which provides context about each set of data. If it later runs the same call again, the system can compare the newly-returned data set to the stored data to see which fields are new, deleted or changed, and it can use that information to generate interesting content. As an example, if a particular person fathered a new baby since the system last called the feed to return information about that person, the system could pick that up and include that as a "tidbit" in the article. A template may include one or more fillable fields for such "tidbits" to keep articles fresh, interesting, and useful with new information.

As noted above, the content elements that are returned from feeds may be saved to a data tree. An example segment of a data tree 601 for subject Mick Jagger is shown in FIG. 6. The format of FIG. 6 is <field name>:<item type>:<data as text>. In addition to the data shown, the data tree also stores information not show that relates to the feed realization, feed-specific data, and similar internal data.

The list of fields any given feed returns can be further manipulated through the database. Fields can be renamed, skipped, flattened or moved to other locations in the data tree. This is useful because each feed returns data in its own format, and in order to use this data the system may need to normalize the tree to a standard. Example tree operations that may be performed include one or more of the following:

Do Nothing: Use the field as-is.

Skip: Don't include the field or any fields under it.

Flatten: Ignore the field, and move all subfields up one level.

Rename: Change the key of the field.

Move: Move the field and its subfield to another location in the tree.

In addition, feed calls may be performed using any suitable process, such as API calls, website crawling, manual input, Amazon Mechanical Turk processing, internal analysis (such as image analysis), external services (such as Google Image artificial intelligence processing), database queries, by parsing the contents of electronic messages, or by other processes.

The system may use a targeted approach to call feeds in a particular order to populate the data tree. To do this, the system may not merely call a feed that is expected to have information that is relevant to a field, but it may develop and consider a structure of fields that are needed to complete the template, as a hole. For example, consider the following very simple article:

"person.name was born in person.dateofbirth, and married to person.spouse who was born on person.spouse.dateofbirth. person.spouse's latest album was person.spouse.albums[0].title. person.name's dad was born on person.parents.father.dateofbirth."

As this shows, the fields follow a tree structure, with a first level this instance person), second level (e.g., date of birth, spouse) that requires knowledge of the first level information because it relates to the first level data point, and optionally additional levels, as shown below:

(1) person
(2) person.dateofbirth
(2) person.spouse
   (3) person.spouse.dateofbirth
   (3) person.spouse.albums
(2) person.parents
   (3) person.parents.father
     (4) person.parents.father.dateofbirth For example, in the field person.spouse.dateofbirth the third level data point refers back to the previous (second) level and will be the date of birth of the spouse of the person. The system will not call a feed to retrieve this data point until the system has (or unless the feed can also provide) the second level data point (spouse) because it needs to identify the spouse before it can identify the date of birth of the spouse.

The system also may perform parallel data collection processes to acquire multiple data points that are on equivalent levels. For example, because the fields person.spouse and person.parents are independent, the system may process both parts of the data tree in parallel once it identifies the person to acquire data points for both the spouse and the parents. This helps speed up the process, as two tasks are performed in parallel, one to populate person.spouse data, and one to populate person.parents data. This parallel processing may be performed for each level of the tree.

Data tree levels as described above may be used in combination with confidence scores as earlier described to determine an optimal order for the feeds that the system will call for certain data points. For example, consider a situation in which three feeds that can populate a template in which the first level of various feeds is "person", and the second level of one of the fields is "spouse":

Feed A: Confidence level 90%: Populates only person.spouse fields nothing else.

Feed B: Confidence level 90%: Populates all of the person fields (usually)

Feed C: Confidence level 80%: Populates all the person fields (usually).

In this scenario, Feeds A and B have the same (very high) confidence level, but feed B populates more fields of the template than Feed A will. Therefore, the system may call Feed B first, and it will call Feed A only if Feed B cannot also populate the second level (spouse). This can speed population time and reduce processing resources. Thus, if two fields have equal confidence levels, the system may first call the feed that is expected to populate more fields in the template.

If the template also has fields with additional second level data points (such as dateofbirth), the system may start with the highest-confidence feed that can populate the most fields (i.e., Feed. B). If Feed B cannot populate person.dateofbirth, the system will then move to Feed C even though it has a lower confidence score than Feed A (80%<90%) because it knows that Feed A cannot provide data for the second-level dateofbirth field.

It should be noted that the "data" collected from feeds as described above is not limited to alphanumeric characters. "Data" also may include digital images, video files or clips, and/or audio files or clips, or other types of digital content. Each such data element may be cached with metadata that associates certain descriptive elements that the system uses to determine the image's relevance to a particular field. The system may generate the descriptive elements based on human input and/or automated analyses (such as a facial recognition process that associates a face with the name of a known person).

It also should be noted that in the discussion above, "feed" is not limited to a published feed accessed via a communication network. "Feed" also may, or alternatively may, refer to a data set from which the system may retrieve content elements.

The system may use these images to populate certain sections of the template based on relevance to other fields of the template. For example, if a first field for something such as stock.pricechange yields data showing that a stock's price went up on a particular day, the system may retrieve an image associated with metadata indicating that it is relevant to showing a price increase (such as an image of an up arrow). The system also may include filters and/or overlays that enable it to modify non-text-based data elements. The system may also modify the non-text based data elements, such as captioning an image before adding it to the template.

Coincidences

Although the data tree can in itself provide enough information for a unique and interesting article, in some embodiments, the system may parse the data tree and/or content elements of other feeds to look for "coincidences" of overlapping data points. Examples of coincidences include:

Husband and Wife passed away on the same date, years apart.

There was a tornado warning while the person was born.

The album was released on the same date the person was baptized.

All of the person's children were born on the same weekday.

The award has an inception date that is the same of the artist's mother's birthdate.

The SAW may scour the data tree and/or other content elements for coincidences, and make those available for the template itself. The template may include a fillable field such as {person.coincidences (1-3)} in which the coincidence may be written, and SAW may identify and write up to three coincidences as complete sentences at that location.

Smart Caching

As noted above in FIG. 1, the system may include one or more databases of reference data that the system may use to populate a template. When "calling" a feed as described above, the system may perform an external call to a service to obtain the data, or it may call the database of reference data to obtain the stored version of the information. This can be especially useful for feeds that provide more than one type of information. For example, the system may call a music information service with a feed request to obtain a band's name and a list of albums that the band has published. The system will store this information in the database in association with a cache-value, which is a value that sets an expiration date beyond which the system may view the data as unreliable or as needing to be refreshed. Each feed may have a default cache value, a template may set a template-specific cache value, or a user or the system may specify a different cache value for any particular feed. For example:

Slow Caching: When writing an article about a musician's new album release, the news is not all that urgent. Thus, the article may request a caching value of up to 24 hours for any data retrieved. This means the feed will use the cached value if the cached data is not older than 24 hours. However, if the cached data is older than 24 hours, the system will call the feed to refresh the data.

Fast or No Caching: When writing about stock data, getting the latest available data is very important. Thus, a feed to retrieve a stock value may have a timeout (cache-value) of 10 minutes and it will call the feed again if the cached data is more than 10 minutes old. Or, an article may specify to never cache the data at all, and always force a refresh. On the other hand if the template is for an article about the performance of a stock during a longer period (such as a month), a cache-value if 24 hours (or more) could be used. The combination of default feed cache values and article-specific override capabilities creates a very powerful way to ensure that each article is based on data with the appropriate 'freshness', and it saves processing time and bandwidth for feed calls if the article has a longer "freshness" period whenever possible.

In addition, the system may use cached data for smart feed mapping, to avoid errors in the future. For example, if the system finds a feed that provides a data point that is known to be accurate, then when calling feeds for that data point the system may start with a direct request to the same field of the same feed in the future. Data points are usually associated with one or more fields that can uniquely identify the source, such as a unique identifier. This way even if a particular cache has expired, when it's refreshed it will start with the source that provided the accurate data and avoid the processing and bandwidth requirements associated with having to call and analyze multiple feeds.

Feed Monitoring

Whenever the system calls a feed it may analyze which fields' data are returned, and review the data for any errors. The system continuously monitor the amount of errors for a feed, and the amount of data returned, and it may temporarily or permanently disable calls to a feed or reduce the confidence score of a feed if the feed is unavailable, if it returns more than a threshold number or percentage of errors in a time period, or if it fails to provide at least a threshold level of data in a time period.

For example, if Feed A starts to fail, after X failures in a Y minute interval, the system may temporarily disable the feed for a time period such as 24 hours. After 24 hours, the system may re-enable calls to the feed, and if it provides correct information at the threshold levels it will clear the error. If the feed is still failing, the system may disable the feed again and mark it for human analysis. The parameters for each feed can be set independently to customize based on knowledge of the specific API or other factors.

History

The SAW also may use a history module to identify changes and new developments that may be included in an article. For example if an existing data tree identifies the members of a band but a new feed call returns the name of a new band member, the system may write that fact into a {band.history} fillable field.

Similarly, the history module may apply a time criterion to search for the number of occurrences over a period of time. As an example, using the history module, when writing an article about a particular US state the system may generate data showing the number of tornadoes in that state over the past year, and it may write that information into an appropriate fillable field.

The history module also may include a comparison function to compare data about a particular subject about corresponding data for other subjects. For example, the system may use the comparison function to determine that a person who is the subject of an article won a particular award more times than anyone else.

The SAW may associate a time stamp with each data tree that it saves. Then, the next time that the SAW processes a particular article template, it may use that time stamp to identify new information about the subject. Newly identified information may be saved to the data tree with an updated time stamp, or to a new data tree with a new time stamp.

Semantics

The SAW may include one or more rules for semantic analysis of attributes to be inserted into fillable fields. For example, if the data tree indicates that a person is male, then when filling a template the system may use this to know whether to refer to a person as He or She in fields such as {person.heshe}. Semantic analysis also may help the system identify the words to associate with one or more attributes that will be inserted into the fillable field. For example, if an attribute of location is a park or a bridge, the semantic analysis may help the system to know that if the location is a park it should use the phrase are "IN the park," but if the location is a bridge is should use "ON the bridge." As a backup, if these semantic rules can't be resolved, the system will default to one or more generic terms, or manual review.

Article Templates

Article templates include the instructions to generate an article, along with some default content and structure, along with various options. Elements of a template may include any or all of the following:

Content to be used in an article.
References to fields anywhere in the data tree, such as{person.spouse.birth location.inception}, which would return the date that the city the spouse was born in what established).
Options to loop through data.
Options to branch using IF statements.
Options to randomly "spin" content—for example, "He [approached|drew closer to|came towards] me" would randomly turn into one of these sentences: (1) He approached me; (2) He drew closer to me; or (3) He came towards me.
Protection from unrealized fields so that certain content is never included if a field within cannot be resolved. Example: for the field <protect>{!art.name} was born on {!art.date of birth}</protect>, if either art.name or art.date of birth could not be resolved, then the entire sentence is not used. This avoids bad sentences.

Templates may contain other templates, recursively. This allows, for example, inserting a summary about a person with just one reference insert_template(person summary, person), while the person_summary field could contain yet other templates. In this situation, the system may identify and issue warnings if a reference is circular.

The system may automatically generate articles in multiple formats, such as text, HTML, MP3, MOV, JPG, JSON, etc. In addition, some templates may enable articles to include unique images, animations, and video. The locations of individual complements of these items may be saved to the data tree. As an example, a template may enable creation of a 20-second video using five existing still images and auto-zoom, plus a specific musical score. Each image has captions generated from the tree, and can be specified to be static, slowly zoom in or out, apply color corrections, etc. The finished video may be saved as a digital video file. As another example, the system creates an image file with an image and text scrolling over the image. Text is generated using the data tree, and the image is retrieved from a service found via the data tree. The system also generates metadata, titles, and summary for the image based on the image meta data and the scrolling text.

User Interface

The system may include a user interface that includes a digital display and input (such as a touch screen, keypad, and/or voice activation) that enables a user to define various elements of a template. For example, the user interface may enable a user to define or edit the template's context such as article title, summary, categories, tags, features image etc. The user interface may also enable the user to edit or define various sentences and/or fillable fields of the template. The user may establish loops, synonyms for "spinning" and other features of the template.

As an example, a user may use the user interface to create an article template that can be used for any musician, as follows:

"Artist.name was born on Artist.birthdate. The latest album is Artist.latestalbum, which is artist.latestalbum.popularity popular. Artist.heshe's next concert will be played in Artist.concerts[1].location, and you can look forward to a day of Artist.concerts[1].location.weathersummary . . . "

Input Engine

Figure 7:
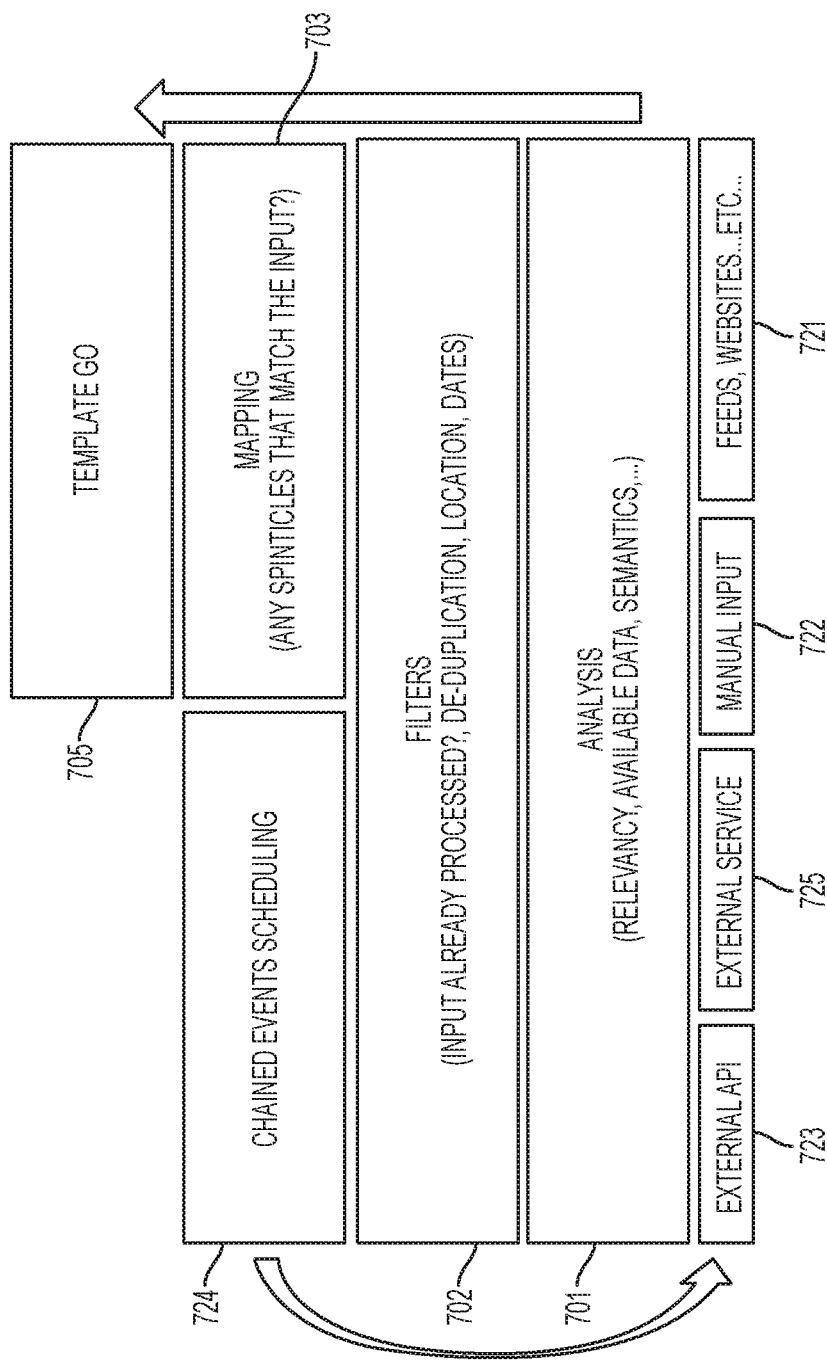
FIG. 7 illustrates example functions of an input engine.

FIG. 7 illustrates various functions that the input engine may implement. The input engine may obtain inputs from online sources 721 such as feeds, websites, Google Alerts; manually input events received via a user interface 722; API's 723; scheduled events and/or chained events 724, and/or other sources 725.

The input engine may include an analysis module 701 that will check incoming content elements for relevancy, such as old events being resent. It may perform analysis of the data to look for unusual signals. For example, if the input engine seeks content elements about the United States stock market, it may set a trigger to return only events associated with big drops or rises (e.g., a threshold 10% swing in an hour). The analysis module can look for that, and ignore events that do not satisfy this criterion.

The input engine also may perform one or more scheduled events, such as to return data for a particular template every year on Christmas Day.

The system also may seek content elements for chained events. A chained event is an event that is triggered based on a previous event. An example of a chained event is when a musician releases a new song. This may trigger the input engine to return information that is relevant to templates for which the musician (or any musician) is a subject. After a threshold period of time (such as 30 days), a chained event is triggered to see if there is new information that would support the need to generate a follow-up article. This may trigger updates to the existing articles, or entirely new articles. The chained event may occur automatically, or it may only occur of specified conditions have been satisfied (such as the song reaching a certain level of popularity on a particular music streaming service or in music sales). Additional chained events may occur later, such as 10 years later on the anniversary of the original release. Chained events may trigger further chained events.

Events can be filtered 702 based on certain criteria, such as the source of the event, the relevance of the data in the event, and other criteria. Filters can be used to check the database or reference data to see if a particular content element has already been used. The system may receive the same event from multiple API's, and so it may need to check whether an article was already generated for the event. The input engine may be configured to not pass the event to the SAW if the SAW already generated an article for the event.

The SAW and/or input engine may prohibit mapping 703 of content elements to templates unless certain criteria are satisfied. For example, a template may only be permitted to run if all of its input signals (or certain input signals designated as key) are satisfied. For example, the system may include a rule to not write an article about a person without a date of birth for the person. However, if the mapping is not prohibited, the input engine will pass the relevant information on to the SAW for creation and/or population of the template 705.

The system may generate different variations of articles for different audiences, using different templates. As an example, the system may use a first template to trigger an article about a new album by an artist, and a second template to trigger another article that discusses rock music and includes this album in it. A third template may generate an article that relates the new album to newly announced concerts.

Output Engine

Figure 8:
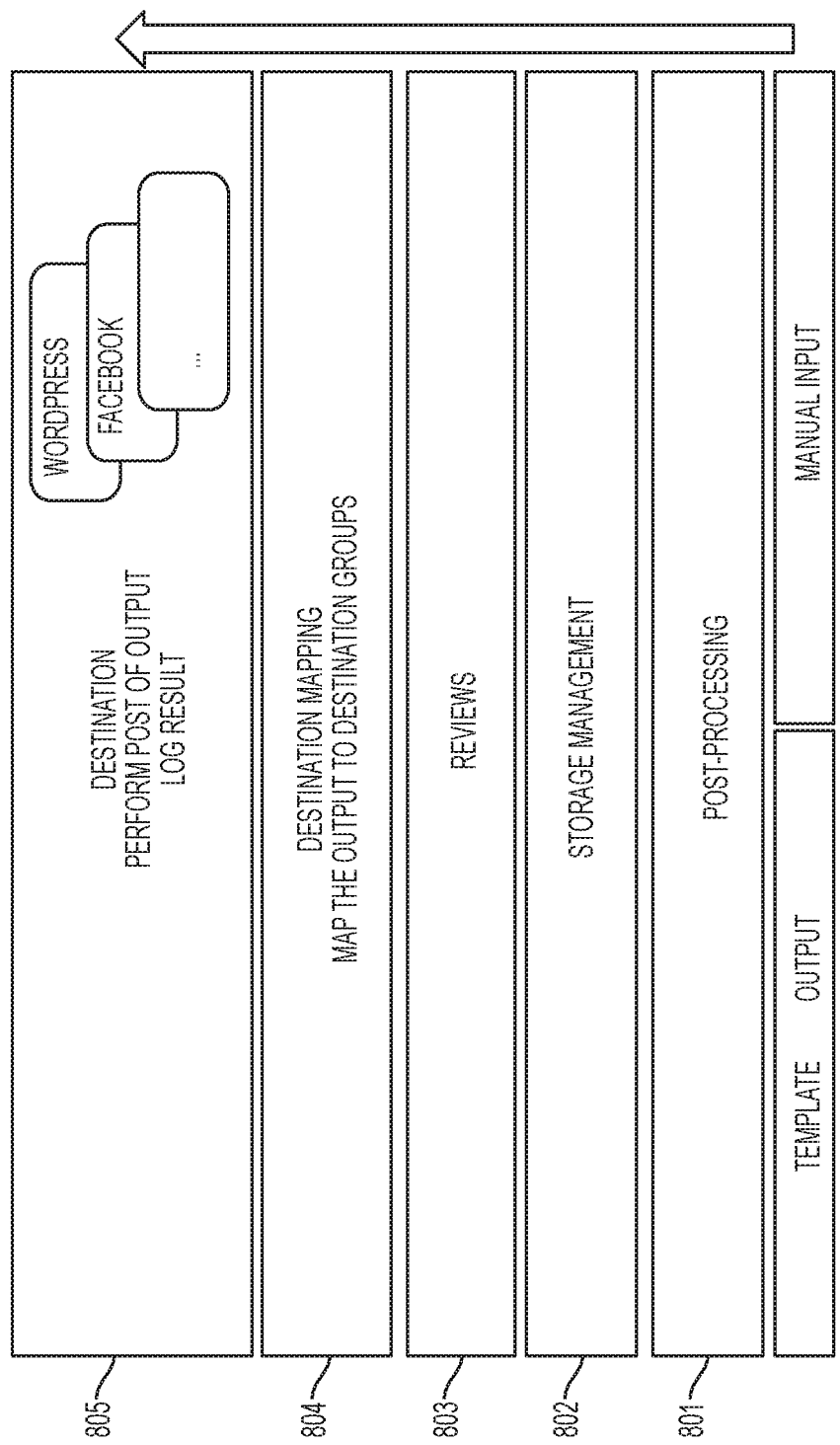
FIG. 8 illustrates example functions of an output engine.

FIG. 8 illustrates various functions that the output engine may include. The output engine takes output from the SAW (optionally with manual input), and performs tasks such as:

Post Processing 801: checks the article for errors, fixes capitalization, generates attribution from the feeds that were actually used, cleans up spacing and punctuation, and/or performs semantic analysis to check for red-flags.

Storage Management 802: stores the output and metadata and updates the database.

Reviews 803: sends the article to a human reviewer for manual review. The output may be added to a review queue, in which case it will not be published until an authorized human approver has manually approved the article.

Destination mapping 804: takes the output and maps it to a number of destinations, optionally using destination groups as described above.

The actual posting may be done by the destination module 805, which has internal modules that each knows how to technically post the content to a content publication service. Posting in some cases results in feedback, such as the final URL on a blog. This result may be stored in the database, so that the system can later go back and update the output.

Figure 9:
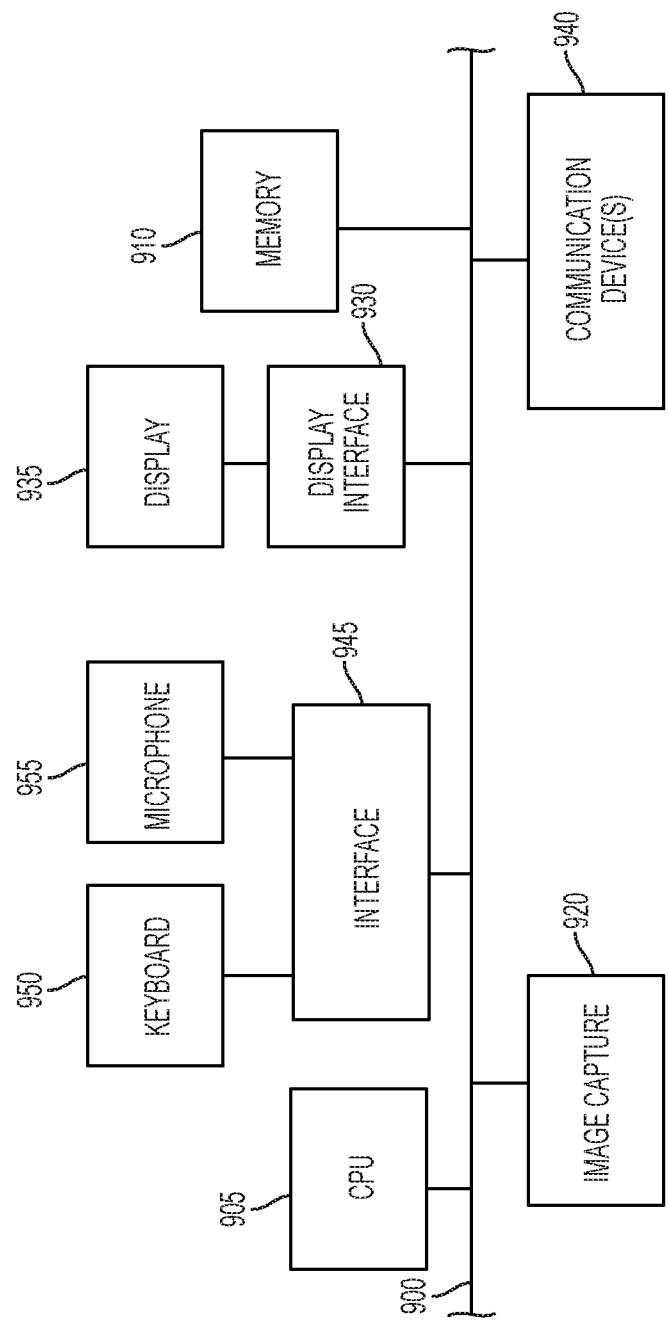
FIG. 9 is a block diagram of hardware that may be used to contain and/or implement program instructions to perform the functions described in this document.

FIG. 9 depicts a block diagram of hardware that may be used to contain or implement program instructions, such as those of the input engine, output engine, and/or semantic article writing engine described above. The hardware may be a stand-alone electronic device, an electronic device that is accessing a hosted service, or a virtual machine or container that serves in any of these roles. A bus 900 serves as an information highway interconnecting the other illustrated components of the hardware. The bus may be a physical connection between elements of the system, or a wired or wireless communication system via which various elements of the system share data. Processor 905 is a processing device of the system performing calculations and logic operations required to execute a program. Processor 905, alone or in conjunction with one or more of the other elements disclosed in FIG. 9, is an example of a processing device, computing device or processor as such terms are used within this disclosure. The processing device may be a physical processing device, a virtual device contained within another processing device, or a container included within a processing device.

A memory device 910 is a hardware element or segment of a hardware element on which programming instructions, data, or both may be stored. Read only memory (ROM) and random access memory (RAM) constitute examples of memory devices, along with cloud storage services.

An optional display interface 930 may permit information to be displayed on the display 935 in audio, visual, graphic or alphanumeric format. Communication with external devices, such as a printing device, may occur using various communication devices 940, such as a communication port or antenna. A communication device 940 may be communicatively connected to a communication network, such as the Internet or an intranet.

The hardware may also include a user input such as a keyboard or keypad 950, or other input device such as a mouse, a touch pad, a touch screen, a remote control, a pointing device, or a video input device. The hardware also may include a microphone 955 for receipt of voice and other audio inputs. Data also may be received from an image capturing device 920 such as a digital camera or video camera.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. An automated content authoring system, comprising:
an input engine comprising a memory portion containing programming instructions that are configured to cause one or more processors to:
access multiple content feeds via a communication network,
retrieve one or more data sets from each of the content feeds, and
analyze each of the retrieved data sets to identify content elements in each of the content feeds, wherein each of the content elements comprises an article key and an attribute;
a semantic article writing engine comprising a memory portion containing programming instructions that are configured to cause one or more processors to generate a digital article by:
processing an article template comprising fillable fields, wherein the article template comprises an article context comprising an article subject type and a subject, and each of the fillable fields includes a field key, wherein the processing comprises, for one or more of the fillable fields:
selecting one or more of the content feeds having a feed subject type that corresponds to the article subject type,
calling the selected one or more content feeds to retrieve a content element having an article key that corresponds to the field key,
in response to retrieving a content element having an article key that corresponds to the field key, inserting the attribute of that content element into the fillable field to yield the digital article; and
an output engine comprising a memory portion containing programming instructions that are configured to cause one or more processors to publish the digital article to a content publication service;
wherein:
the field keys for at least some of the fillable fields require at least two levels of data;
the input engine also includes programming instructions configured to cause one or more processors to assign, to each of the content feeds:
one or more feed subject types, and
a confidence level for each of the feed subject types; and
the programming instructions to cause the semantic article writing engine to select one or more of the content feeds having a feed subject type that corresponds to the article subject type comprise instructions to:
identify and select a content feed having (i) a feed subject type that semantically matches the article subject type, and (ii) a confidence level of at least a first threshold value for the feed subject type by:
if multiple candidate content feeds have equivalent confidence levels, selecting a particular content feed that can provide first level data so that the particular content feed can provide data for multiple fillable fields.

2. The system of claim 1, wherein:
the field keys for at least some of the fillable fields require at least two levels of data; and
the programming instructions to select one or more of the content feeds also comprise instructions to, when selecting the one or more content feeds for any fillable field having at least two levels, only selecting a particular content feed to provide second level data for that fillable field if the system has already obtained, or the particular content feed can also provide, first level data for the field.

3. The system of claim 1, wherein the programming instructions to cause the semantic article writing engine to select one or more of the content feeds having a feed subject type that corresponds to the article subject type further comprise instructions to:
if the selected content feed does not retrieve a content element having an article key that corresponds to the field key, select an alternate content feed having:
a feed subject type that semantically matches the article subject type, and
a confidence level for the feed subject type of at least a second threshold value, wherein the second threshold value is lower than the first threshold value.

4. The system of claim 1, wherein:
the article template comprises a plurality of sentences;
at least some of the fillable fields are components of the sentences of the template; and
the programming instructions to cause the semantic article writing engine to generate the digital article comprise instructions to, for any fillable field for which the calling step does not retrieve a content element having an article key that corresponds to the field key, either omit the sentence that includes that fillable field or modify the sentence that includes that fillable field.

5. The system of claim 1, wherein
the article template comprises at least one sentence with a sentence fragment having a plurality of alternatives; and
the programming instructions to cause the semantic article writing engine to generate the digital article also comprise instructions to randomly select one of the plurality of alternatives and use the randomly selected alternative as the sentence fragment in the digital article.

6. The system of claim 5, further comprising additional programming instructions configured to cause the semantic article writing engine to generate an additional digital article by:
randomly selecting a different one of the plurality of alternatives; and
using the article template, the retrieved content element and the randomly selected different alternative as a sentence fragment for the additional digital article.

7. The system of claim 1, wherein:
the article template comprises at least one fillable field for which the field key is a coincidence; and
the programming instructions to cause the semantic article writing engine to generate the digital article also comprise instructions to identify any coincidental data points in the data set and, upon detecting a ground of coincidental data points, complete the fillable field with information relating to the coincidental data points.

8. The system of claim 1, wherein:
the template includes programming code for presentation of dynamic content via a media player or browser, along with the fillable fields; and
the output comprises a script for presentation of the dynamic content via the media player or browser.

9. The system of claim 1, wherein the programming instructions that are configured to cause one or more processors to publish the digital article to a content publication service comprise instructions that are configured to cause one or more processors to transmit the article to a recipient.

10. An automated content authoring system, comprising:
a semantic article writing engine comprising a memory portion containing programming instructions that are configured to cause one or more processors to generate a digital article by:
maintaining a data tree comprising a plurality of content elements, each of which has an article key and an attribute;
processing an article template comprising a plurality of sentences, at least some of which comprise fillable fields, wherein the article template comprises an article context comprising an article subject type and a subject, and each of the fillable fields includes a field key;
selecting a data set that corresponds to the article subject type and the subject;
for each of the fillable fields:
selecting, from the data tree, a content element having an article key that corresponds to the field key, and
in response to retrieving a content element having an article key that corresponds to the field key, inserting the attribute of that content element into the fillable field to yield the digital article; and
causing one or more processors to publish the digital article to a content publication service;
wherein:
the field keys for at least some of the fillable fields require at least two levels of data;
the input engine also includes programming instructions configured to cause one or more processors to assign, to each of the content feeds:
one or more feed subject types, and
a confidence level for each of the feed subject types; and
the programming instructions to cause the semantic article writing engine to select one or more of the content feeds having a feed subject type that corresponds to the article subject type comprise instructions to:
identify and select a content feed having (i) a feed subject type that semantically matches the article subject type, and (ii) a confidence level of at least a first threshold value for the feed subject type by:
if multiple candidate content feeds have equivalent confidence levels, selecting a particular content feed that can provide first level data so that the particular content feed can provide data for multiple fillable fields.

11. The system of claim 10, wherein:
the field keys for at least some of the fillable fields require at least two levels of data; and
the programming instructions to select content elements for each of the fillable fields also comprise instructions to, when selecting content element for any fillable field having at least two levels, only selecting a particular content element to provide second level data for that fillable field if the system has already obtained, or the particular content element can also provide, first level data for the field.

12. The system of claim 10, wherein the programming instructions to cause the semantic article writing engine to select a data set having a subject type that corresponds to the article subject type comprise instructions to:
if the selected data set does not include a content element having an article key that corresponds to the field key, select an alternate data set having:
a subject type that semantically matches the article subject type, and
a confidence level of at least a second threshold value, wherein the second threshold value is lower than the first threshold value.

13. The system of claim 10, wherein:
the article template comprises a plurality of sentences;
at least some of the fillable fields are components of the sentences of the template; and
the programming instructions to cause the semantic article writing engine to generate the digital article comprise instructions to, for any fillable field for which the calling step does not retrieve a content element having an article key that corresponds to the field key, either omit the sentence that includes that fillable field or modify the sentence that includes that fillable field.

14. The system of claim 10, wherein:
the article template comprises at least one sentence with a sentence fragment having a plurality of alternatives; and
the programming instructions to cause the semantic article writing engine to generate the digital article also comprise instructions to randomly select one of the plurality of alternatives and use the randomly selected alternative as the sentence fragment in the digital article.

15. The system of claim 14, further comprising additional programming instructions configured to cause the semantic article writing engine to generate an additional digital article by:
randomly selecting a different one of the plurality of alternatives; and
using the article template, the retrieved content element and the randomly selected different alternative as a sentence fragment for the additional digital article.

16. The system of claim 10, wherein:
the article template comprises at least one fillable field for which the field key is a coincidence; and
the programming instructions to cause the semantic article writing engine to generate the digital article also comprise instructions to identify any coincidental data points in the data set and, upon detecting a ground of coincidental data points, complete the fillable field with information relating to the coincidental data points.

17. The system of claim 10, wherein:
the template includes programming code for presentation of dynamic content via a media player or browser, along with the fillable fields; and
the output comprises a script for presentation of the dynamic content via the media player or browser.

18. The system of claim 10, wherein the programming instructions that are configured to cause one or more processors to publish the digital article to a content publication service comprise instructions that are configured to cause one or more processors to transmit the article to a recipient.

* * * * *